(12) United States Patent
Du Toit et al.

(10) Patent No.: US 6,183,634 B1
(45) Date of Patent: Feb. 6, 2001

(54) SEPARATOR

(75) Inventors: Walters Francois Du Toit, Stilfontein; Rudolf Max Vey, Bedfordview, both of (ZA)

(73) Assignee: Bateman Process Equipment Limited, Boksburg North (ZA)

( * ) Notice: Under 35 U.S.C. 154(b), the term of this patent shall be extended for 0 days.

(21) Appl. No.: 09/282,435

(22) Filed: Mar. 31, 1999

(30) Foreign Application Priority Data

Apr. 2, 1998 (ZA) ........................................ 98/2807

(51) Int. Cl.[7] ..................................... B01D 21/02
(52) U.S. Cl. .................... 210/194; 210/521; 210/532.1
(58) Field of Search .................................. 210/194, 519, 210/521, 522, 532.1, 538, 540

(56) References Cited

U.S. PATENT DOCUMENTS

| | | |
|---|---|---|
| 378,495 | 2/1888 | Colles . |
| 1,043,698 | 11/1912 | Holthoff . |
| 1,176,774 * | 3/1916 | Morris ................................. 210/521 |
| 1,176,775 * | 3/1916 | Morris ................................. 210/521 |
| 1,274,814 * | 8/1918 | Sundness et al. .................... 210/521 |
| 1,345,090 | 6/1920 | Keller . |
| 2,793,186 | 5/1957 | Dunell et al. . |
| 3,239,066 | 3/1966 | Schick . |
| 3,797,203 | 3/1974 | Murdock, Sr. . |
| 4,816,146 * | 3/1989 | Schertler ............................. 210/522 |
| 4,897,206 * | 1/1990 | Castelli ............................... 210/522 |
| 4,921,609 * | 5/1990 | Fromson ............................. 210/522 |
| 4,988,441 * | 1/1991 | Moir ................................... 210/522 |
| 5,013,431 | 5/1991 | Doets . |
| 5,277,806 | 1/1994 | Kuntz . |
| 5,433,862 * | 7/1995 | Batson ................................ 210/521 |
| 5,800,715 | 9/1998 | Batson . |

* cited by examiner

*Primary Examiner*—Christopher Upton
(74) *Attorney, Agent, or Firm*—Burns, Doane, Swecker & Mathis, LLP

(57) ABSTRACT

A separator includes a vessel having feed means for feeding liquid containing suspended solids into the vessel, a liquid outlet, a sludge outlet, and at least one settling member located above the sludge outlet, the settling member having an inner settling surface and outer settling surface, with the inner settling surface surrounding an aperture extending through settling member.

7 Claims, 4 Drawing Sheets

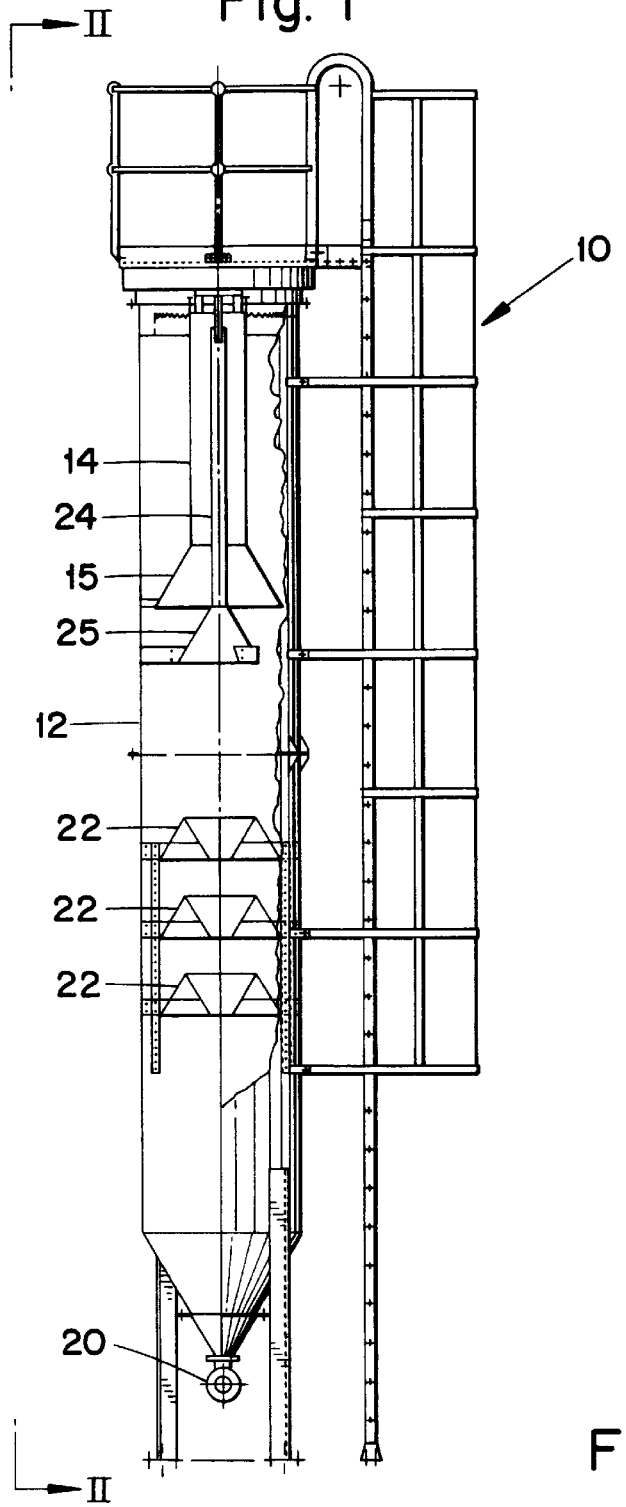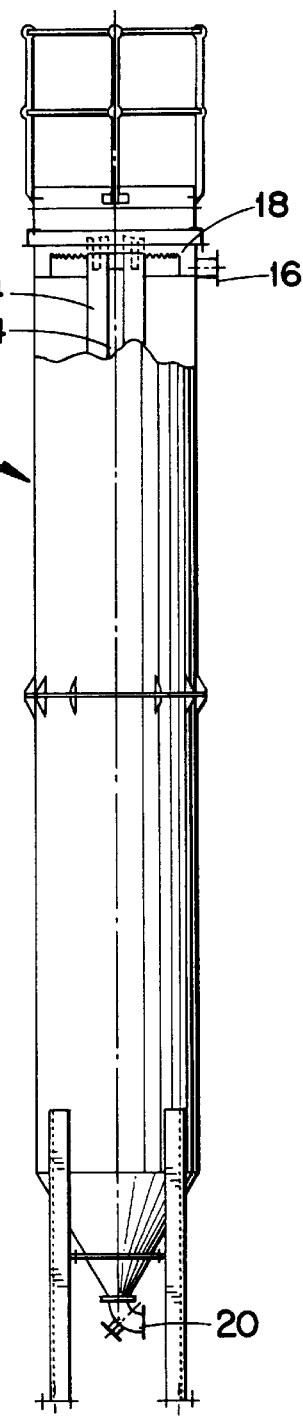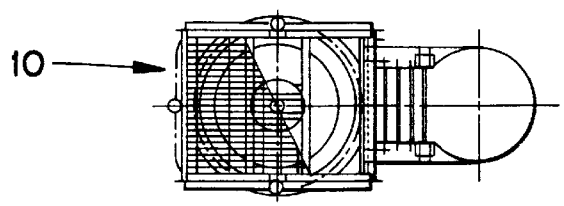

Fig. 4
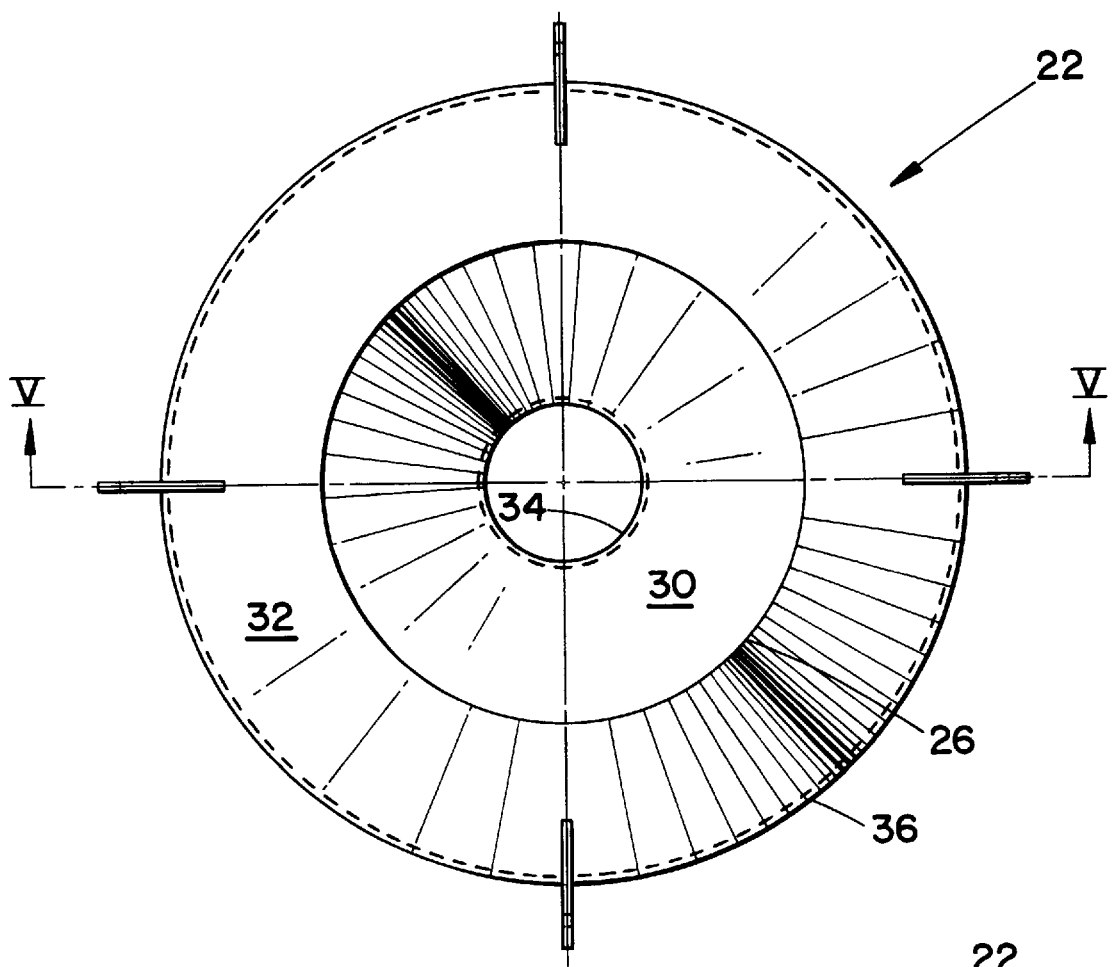
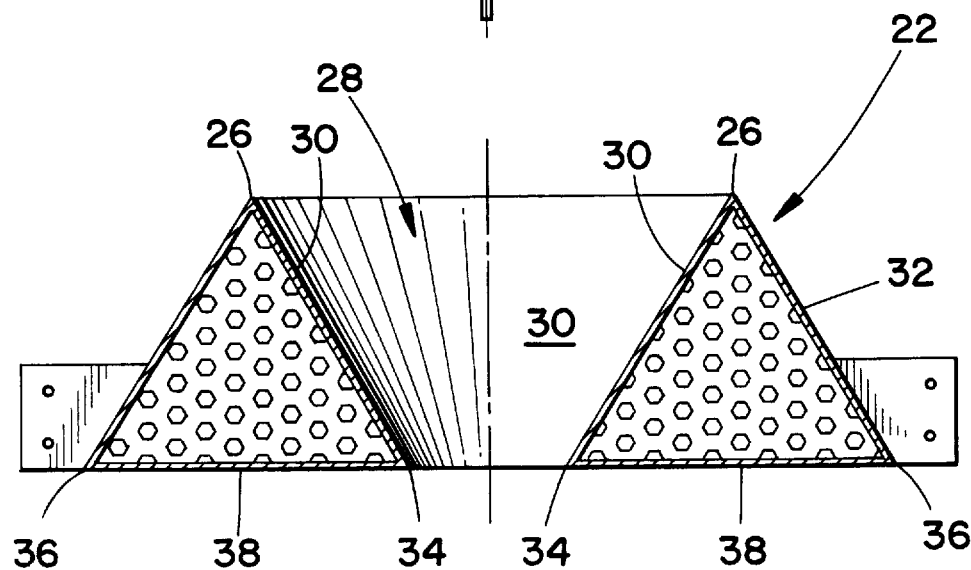
Fig. 5

SEPARATOR

BACKGROUND OF THE INVENTION

This invention relates to a separator for separating solids suspended in a liquid from the liquid.

Separators have been provided with settling members which have settling surfaces onto which solids can settle. The settling members have been provided in the form of cones, spirals or inclined angle-iron sections.

SUMMARY OF THE INVENTION

According to the invention a separator includes a vessel having;

feed means for feeding liquid containing suspended solids into the vessel;

a liquid outlet;

a sludge outlet; and at least one settling member located above the sludge outlet, the settling member having inner and outer settling surfaces, with the inner settling surface surrounding an aperture extending through the settling member.

The settling member may be endless and the inner and outer settling surfaces may be connected together at an apex. Preferably the inner and outer settling surfaces diverge away from one another from the apex. In one form of the invention the apex is circular in plan view. In another form of the invention the apex is polygonal in plan view.

The feed means preferably includes a downwardly extending feed conduit.

A recycle conduit may be provided for recycling liquid into the feed conduit.

BRIEF DESCRIPTION OF THE DRAWINGS

FIG. 1 is a cross-sectional side view of a separator according to the invention;

FIG. 2 is a side view on line II—II of FIG. 1;

FIG. 3 is a plan view of FIG. 1;

FIG. 4 is a plan view of settling member according to the invention;

FIG. 5 is a cross-sectional side view on line V—V of FIG. 4;

DETAILED DESCRIPTION OF THE EMBODIMENTS

Figure 6:
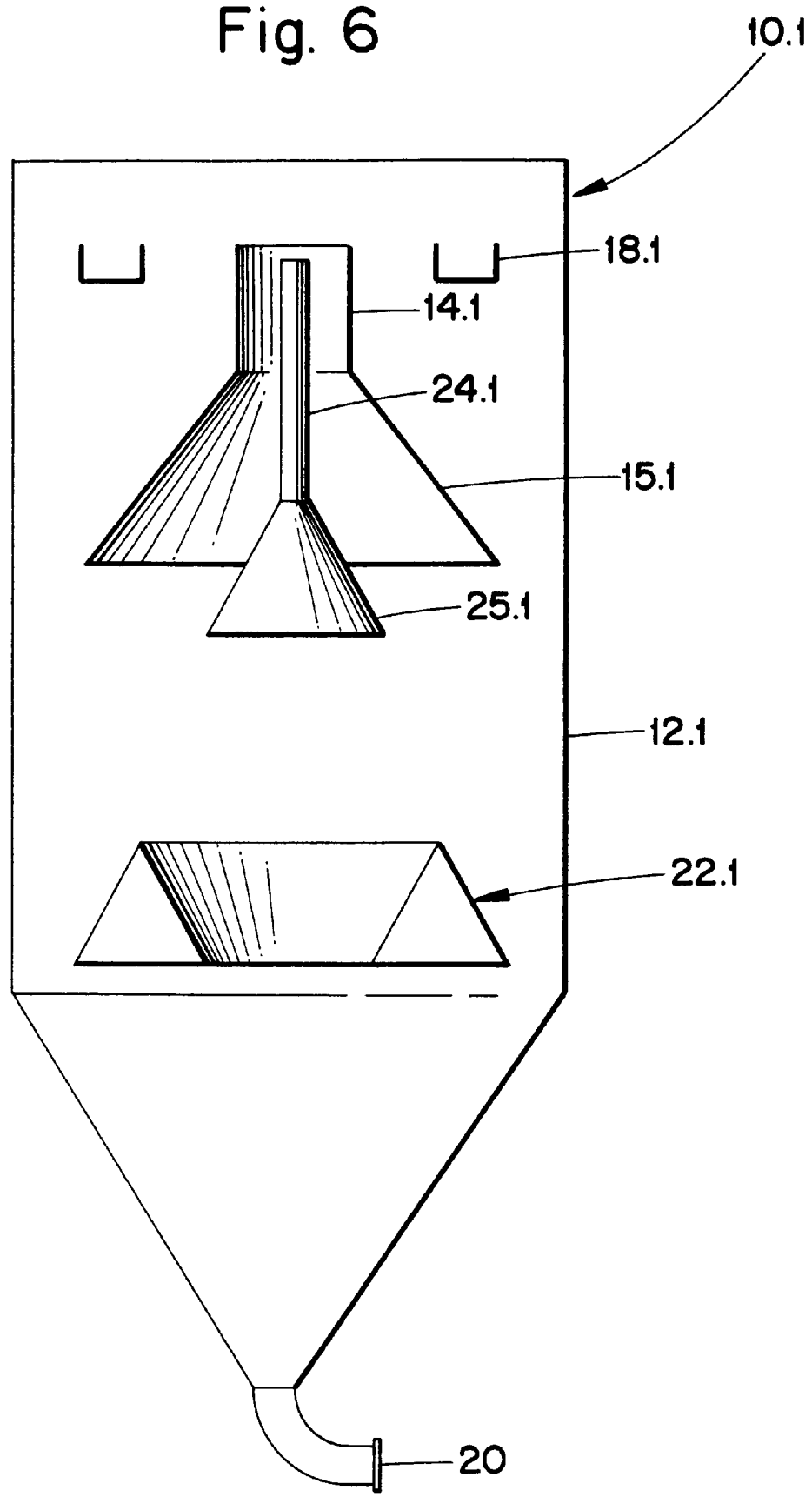
FIG. 6 is a cross-sectional side view of a separator according to another embodiment of the invention.

Referring firstly to FIGS. 1 to 3, a separator 10 includes a vessel 12 having a feed conduit 14 with a diverging feed section 15, a liquid outlet 16 from a launder 18, a sludge outlet 20, three endless settling members 22 and a recycle conduit 24 having a collector 25.

Referring now to FIGS. 4 and 5, each endless settling member 22 has a substantially horizontally extending apex 26, an aperture or bore 28, an endless inner settling surface 30 and an endless outer settling surface 32. The settling surfaces 30 and 32 diverge downwardly and outwardly from the apex 26 towards their respective lower ends 34 and 36.

Each settling member 22 is moulded from glass reinforced plastic or fibre reinforced plastic or is fabricated from suitable material. The inner and outer settling surfaces are coated with a 3 mm thick, high density polyethylene coating to facilitate the flow of particles over the surfaces.

The settling member 22 is hollow and is filled with particulate material. Although the settling member has a base 38, it will be appreciated that the settling member may not have a base, in which case water would occupy the space between the settling surfaces 30 and 32.

In use, liquid containing suspended solids and a flocculant is introduced into the feed conduit 14 below the launder 18. As the suspension moves downwardly, its velocity decreases in the diverging feed section 15. The suspension is directed peripherally outwardly as it flows between the annular gap between the diverging feed section 15 and the collector 25. Smaller solid particles rise upwardly through the annular gap between the sidewalls of the vessel 12 and the feed conduit 14. A floc bed (not shown) is formed between the diverging feed section 15 and the sidewalls of the vessel 12. The smaller solid particles agglomerate within the floc bed and settle downwardly towards the settling members 22. The downwardly settling agglomerated solid particles from the floc bed, and the downwardly settling larger solid particles from the feed conduit, settle on the inclined endless settling surfaces 30 and 32. The solids slide downwardly along and off the settling surfaces 30 and 32 to collect in the form of a sludge below the settling members 22. That is, the lower end 36 of the outer settling surface 32 is spaced from an inner surface of the vessel 12 and forms a drop-off edge permitting solids to side downwardly therefrom. The sludge is discharged from the vessel 12 through the sludge outlet 20.

Relatively clean water flows upwardly. Some of the upwardly flowing relatively clean water is collected in the collector 25, whereupon it rises upwardly through the recycle conduit 24 to be discharged into the feed conduit 14 to dilute the feed. The diameter of the bottom of the collector 25 is substantially the same as the diameter of the apex 26 of the settling members 22. The remaining relatively clean water, not collected in the collector 25, flows upwardly through the annular gap between the sidewalls of the vessel 12 and the feed conduit 14 into the launder 18, from whence it is discharged via the liquid outlet 16.

The total surface area of the inner and outer settling surfaces on one of the settling members is more than double the total settling surface area of two cones of the same height and inclination as one of the settling members. The applicant believes that this increased settling area will result in a more efficient separation process. In addition, the outer settling surface 32 is located more directly in the pathway of the downwardly settling solid particles than the settling surface 30. The applicant believes that this will also result in a more efficient separation process.

Figure 7:
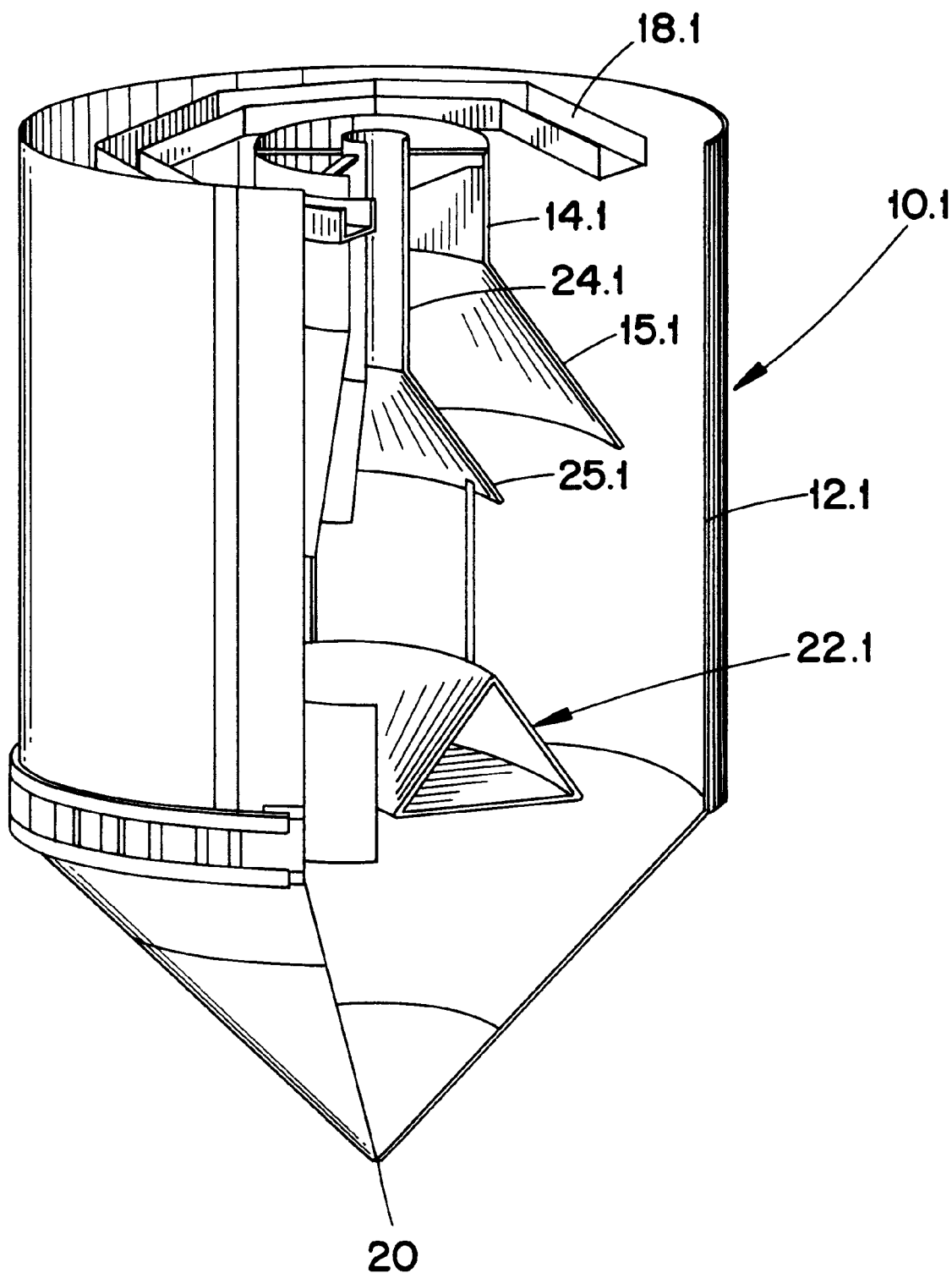
FIG. 7 is a partly cut-away perspective view of the separator of FIG. 6.

Referring now to FIGS. 6 and 7 a separator 10.1 is shown which is similar to the separator 10. The suffix .1 is used to denote parts in the separator 10.1 corresponding to parts in the separator 10. The separator 10.1 operates in the same manner as the separator 10, and fresh feed is fed into the top of the feed conduit 14.1.

It will be appreciated that many modifications or improvements of the invention are possible without departing from the spirit or scope of the invention.

We claim:

1. A separator including a vessel having:

feed means for feeding liquid containing suspended solids into the vessel;

a liquid outlet;

a sludge outlet; and at least one settling member located above the sludge outlet, the settling member having inner and outer settling surfaces onto which downwardly settling solids can settle, the settling surfaces diverging downwardly away from one another and surrounding a passageway, with the inner settling surface facing towards the passageway to define a passageway of downwardly narrowing cross section the outer settling surface facing away from the passageway;

wherein a lower end of the outer settling surface faces and is spaced from an inside surface of the vessel and defines a drop-off edge permitting solids to slide downwardly off the lower end and gravitate downwardly past the at least one settling member.

2. The separator of claim 1 wherein the settling member is endless.

3. The separator of claim 1 wherein the inner and outer settling surfaces are connected together at an apex.

4. The separator of claim 3 wherein the apex is circular in plan view.

5. The separator of claim 3 wherein the apex is polygonal in plan view.

6. The separator of claim 1 wherein the feed means includes a downwardly extending feed conduit.

7. The separator of claim 1 including a recycle conduit.

\* \* \* \* \*